United States Patent [19]

Hanner

[11] Patent Number: 4,479,079
[45] Date of Patent: Oct. 23, 1984

[54] APPARATUS FOR VARYING THE SPEED OF DC MOTORS

[76] Inventor: John C. Hanner, 407 Transylvania Ave., Raleigh, N.C. 27609

[21] Appl. No.: 544,255

[22] Filed: Oct. 21, 1983

[51] Int. Cl.³ .............................................. H02P 7/28
[52] U.S. Cl. .................................. 318/345 G; 318/346; 318/361; 318/439; 318/541
[58] Field of Search ............... 318/439, 337, 338, 339, 318/340, 345 C, 345 G, 346, 360, 361, 541, 538

[56] References Cited

U.S. PATENT DOCUMENTS

| | | | |
|---|---|---|---|
| 2,006,172 | 6/1935 | Klappauf | 318/340 X |
| 2,905,876 | 9/1959 | Hillman | 318/346 X |
| 2,986,687 | 5/1961 | Mohan | 318/346 X |
| 4,247,808 | 1/1981 | Hanner | 318/345 G |

Primary Examiner—J. V. Truhe
Assistant Examiner—Bentsu Ro
Attorney, Agent, or Firm—Mills and Coats

[57] ABSTRACT

The commutator of a DC motor is uniquely constructed to include at least one dead segment at least as wide as the associated brush (brushes). A silicon controlled rectifier (SCR) is arrranged in the circuit between the voltage source and said brush (brushes) to provide a switching means to automatically cut off current flow therethrough each time a brush passes over the dead segment. The current is reestablished by way of a gating means, which in the preferred embodiment is a variable frequency pulse generator.

5 Claims, 5 Drawing Figures

NEAR MAX. SPEED

NEAR MIN. SPEED

APPARATUS FOR VARYING THE SPEED OF DC MOTORS

BACKGROUND OF INVENTION

The speed control of DC motors has long been a problem as far as energy conservation is concerned when the motor is not operated at "full throttle", but at some varying lesser speed from zero to full rpm. Such examples include electric automobiles or golf carts where gradual application of power and an increasing application of power would be desired as the vehicle begins to move and increase speed or if the vehicle were desired to operate at less than full speed. Further examples of variable speed, DC motor situations include high and low speed heater and air conditioner fans, electric windshield wiper motors, and many others.

In order to vary the speed of a DC motor, by far the most commonly used prior method is to place one or more resistors or a variable resistor in series with the motor and battery or other power source. The torque or speed of the motor is then varied by increasing or varying the number of these resistors or the amount of resistance in the circuit to the motor. The disadvantage of this method is readily apparent as far as wasted energy is concerned because controlling the speed in this manner means that 100% of the power output of the battery or power source is always being pulled, regardless of the motor speed. If the motor is not operating in full capacity, the remainder of the power generated by the power source is wasted in the control or "drain" resistors in the form of heat. To further compound this situation in some cases it is even necessary to use a companion electric motor to operate a fan to blow cool air across the resistors.

Other speed control methods include rheostatic adjustment of the field current which varies the field strength, however, this also requires full voltage at all times from the power source. The Ward-Leonard system is another speed control technique which utilizes a generator to supply the motor armature and does do away with the armature rheostatic losses. However, this approach is extremely expensive as far as initial expense of added equipment is concerned.

A further approach is shown and described in applicant's earlier U.S. Pat. No. 4,247,808 issued Jan. 27, 1981. In the aforesaid patent the approach is to provide an alternating pattern of segments separated by large non-conducting "dead spaces". While the approach there disclosed results in an operable embodiment, it requires a specially built commutator, which is expensive. Further, in Column 4, Lines 17 through 27 of the earlier patent it is disclosed that existing commutators can be modified by deadening alternating segments, this results in a severe loss of efficiency.

SUMMARY AND OBJECTS OF INVENTION

In the present invention, however, voltage losses through variable control resistors or rheostats are done away with in a manner which is not initially expensive. In essence, the present invention utilizes a solid state switch (silicon controlled rectifier or similar discrete device) to limit the amount of time current which is conducted through the commutator to the motor, thus reducing the power input. By decreasing the amount of time current is applied, the motor may be operated at a reduced speed or torque. The advantage here is that there is no waste of energy, since essentially all of the power from the power source is utilized to drive the motor, and none is lost in rehostats in the form of heat. Further, it is not necessary to manufacture special commutators as existing units may be modified in such a way as to avoid loss of efficiency.

In its broadest sense the present invention then is directed to a conventional commutator which has a single segment thereof deadened. This may be accomplished by disconnecting the selected segment to its normally corresponding point in the armature winding. The space defined by the selected "dead" segment is at least as great as the corresponding width dimension of the brushes against which the segments are pressed to transmit current from the power source to the armature. A time delay switching means (silicon controlled rectifier or other similar device) in the electrical circuit between the power source and the commutator limits the amount of time current is applied to the brushes while the live commutator segments are passing thereby and in engagement therewith. As the last live segment leaves the brush against which it is pressed, the brush faces the electrically dead segment and the current from the power source is interrupted for a period of time. Because of the unique character of the SCR, current will not again be transmitted to the next "live" or conductive segment, even when it engages a brush, until the SCR or similar switching means is gated. This time delay can be varied by a variable resistor/capacitor gating circuit leading to the cathode of the SCR as disclosed in previous U.S. Pat. No. 4,247,808. Alternatively, other solid state devices such as Hall effect devices, relays, movable commutator-brush assemblies, etc., can be used. Further, and in the preferred embodiment of the present invention, the gating is accomplished by a unique variable frequency pulse generator circuit. This gating circuit incorporates a voltage regulator, pulse generator, dual data flip-flop, quad AND gate, and transistors arranged to generate control pulses to the SCR switching devices. During the time the circuit is interrupted, no appreciable voltage is drained from the power source and dissipated in the form of heat.

Since the electrically dead segment is greater in width than the brushes of a conventional commutator, it is possible that the motor may be stopped with one of the brushes completely in the electrically dead spaces. However, the other brush would be adjacent a live segment and therefore the problem realized and solved in U.S. Pat. No. 4,247,808 would not occur.

It is therefore one object of the present invention to provide an improved speed control method and apparatus for DC motors.

It is another object of the present invention to provide a method and apparatus for controlling the speed of a DC motor which utilizes modified conventional commutators, and provides a considerable savings of energy during operation.

It is yet a further object of the present invention to provide a speed control method and apparatus for DC motors which delays the deliverance of current to the commutator segments of the motor wherein the amount of time of delay can be varied to control the speed or torque thereof.

Other objects and advantages of the present invention will become apparent and obvious from a study of the following description and the accompanying drawings which are merely illustrative of the present invention.

DETAILED DESCRIPTION OF INVENTION

Turning now to a discussion of a preferred embodiment of the invention, in the usual four pole DC motor, there is a constant flow of electric current through the field, brushes, commutator and armature. This DC current flow is uniterrupted because the conventional commutator segments are so arranged that as one segment is leaving a brush, another is arriving. The brush width is greater than the space between segments and therefore a portion of the brush is always in contact with one segment or the next or at times both. This sequence continues at all times as the armature rotates. In accordance with the present invention, the general concept is to interrupt the continuous flow of current at least once each rotation so that an SCR or other electronic switching device in the circuit is turned off as a selected segment of the commutator leaves the brush. Then, even though the circuit is re-established when the next conducting segment engages the brush, current does not flow until the switching device is reactivated or "gated". The time of such gating may be varied to control the power supplied to the motor and thus the speed thereof.

Figure 1:
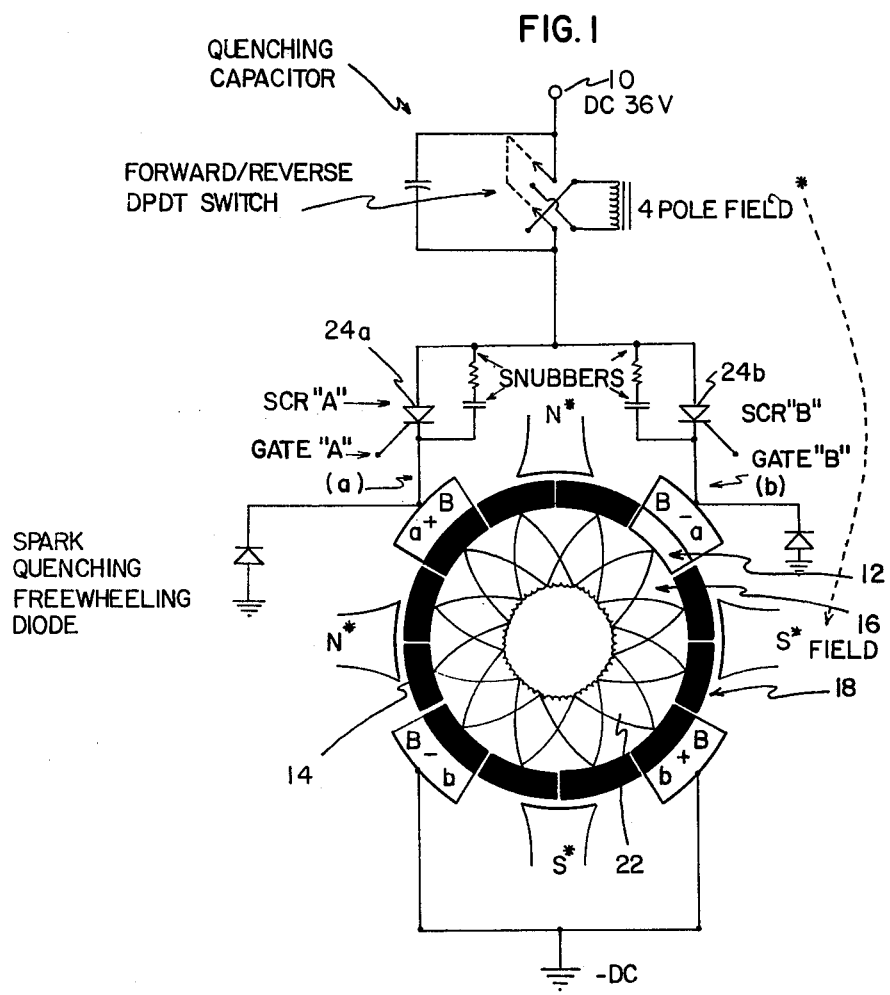
FIG. 1 is a simple schematic representation of the circuit to the commutator and the unique arrangement of the commutator itself with respect to the brushes.

Turning now to FIG. 1, there is illustrated in its simplest form a schematic representation of the concept of the present invention. Current from a power source or battery 10 is delivered to a first brush B$\overset{+}{a}$ adjacent one side of a commutator 14. The circuit is completed by means of a pickup brush B$\overset{+}{b}$ which picks up the current on the other side of the commutator 14 and delivers it to ground or back to battery 10. Likewise brush B$\overline{a}$ and pickup brush B$\overline{b}$ deliver current to the commutator 14. As illustrated in FIG. 1 the first aspect of the present invention involves elimination of one segment 12 in the commutator 14 by disconnecting the selected segment from the field winding as shown at 16. As a result there is provided a plurality of conducting segments 18 with one dead segment 12. The space 12 must, of course, be at least as great as the corresponding width dimension of brushes B+ and B−, so that during rotation when brush B+ or B− leaves the last conducting segment 18 there is sufficient space between that segment and the next live segment to interrupt the current flow. It should be noted that the conducting segments 18 are each wired into the armature by means of conducting wires 22.

Associated with the commutator is switching means 24a, 24b, such as for example gated SCR's. At this point it is sufficient to note that the SCR in switching circuits 24a, 24b will turn off each time the dead segment 18 of commutator 14 passes the corresponding brush B$\overset{+}{a}$ or B$\overline{a}$ brush. Thereafter the SCR will not be turned on again until reactivated or "gated" by the gating circuit (FIG. 2), which time can be varied to control the speed of the motor.

Figure 2:
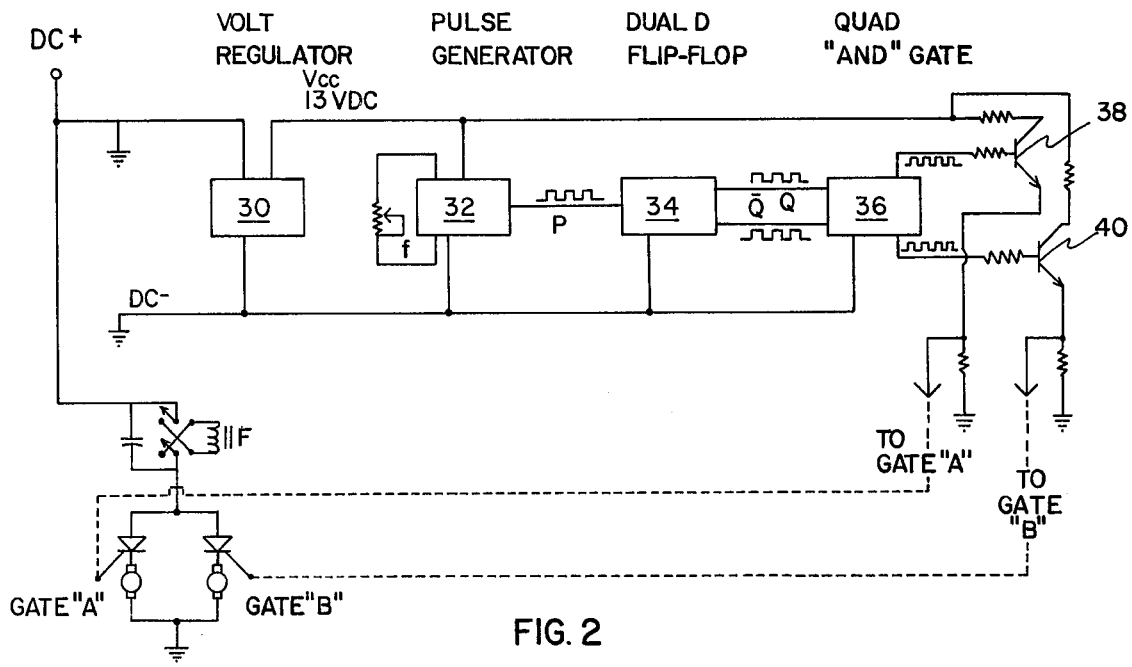
FIG. 2 is a simple schematic representation of the unique gating circuit utilized with the present invention.
Figure 3:
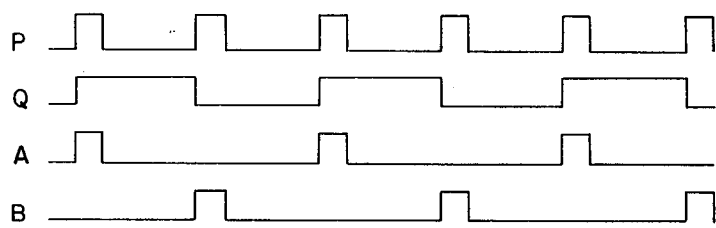
FIG. 3 is a timing diagram illustrative of the pulse signals generated by the gating circuit of FIG. 2.

FIG. 2 is illustrative of a gating circuit, parallel to the power supply line, which utilizes a minimum of current (on the order of milliamperes) to control a motor drawing considerable current and generating considerable horsepower. In the gating means FIG. 2, voltage from the DC power source 10 which operates the motor is first reduced through voltage regulator 30 to a suitable level for the gating circuit. A pulse generator 32, having a variable frequency control, then produces and delivers a square wave signal to a dual data flip flop IC 34. Two pulse signals, 180° out of phase with each other, (called a Q-wave shape) are then delivered to a quad AND gate 36. Each of two output signals of the identical frequency, but 180° out of phase with each other, are then delivered to one of two transistors 38, 40. Each time one of transistors 38, 40 receives a pulse, it delivers the proper voltage and current to its corresponding SCR 24a, 24b to regate the device.

Figure 4A:
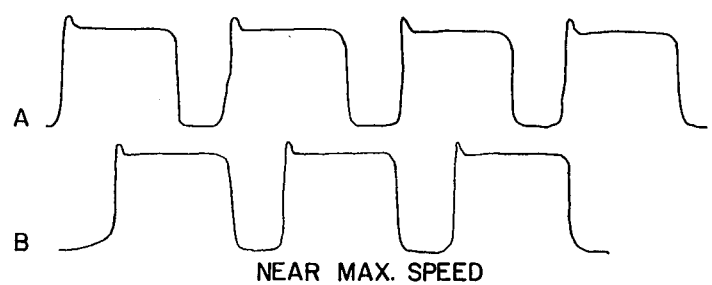
FIGS. 4a and 4b are a pair of graphic representations of an oscilloscope trace of points A and B of the schematic in FIG. 1 with FIG. 4a representing near maximum speed and FIG. 4b representing near minimum speed.
Figure 4B:
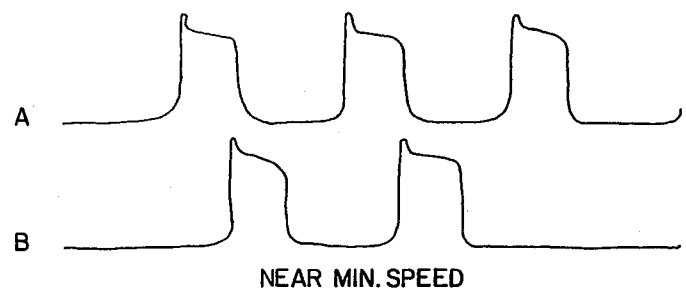

FIGS. 4a and 4b show oscilloscope traces of voltages appearing at cathodes A and B on the schematic in FIG. 2. The upper tracing is at near maximum rpm and the lower tracing at near minimum rpm.

Although the silicon controlled rectifier is utilized as the preferred solid state electronic switch it should be apparent that other discrete electronic switching devices, which may be interrupted and then reactivated according to a delayed time pattern, might be utilized in the same manner. The important thing is that the present method and apparatus utilize a voltage interruption type approach to control the speed of the DC motor, rather than the conventional "drain resistors" which are a complete waste of energy.

The present invention, may of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In an electric motor of the type having an armature with the rotor windings thereof electrically connected to a commutator, a set of brushes for applying current to the commutator segments, and the entire motor powered by a source of DC voltage, the improvement whereby:
   a. said commutator includes one dead commutator segment having a peripheral width dimension at least as great as the corresponding dimension of one of said brushes whereby as the dead segment leaves a brush, current is interrupted;
   b. electronic switching means in the electrical circuit between said source and said commutator for maintaining said current interruption from the DC voltage source to the brushes until reactivation of said switching means; and
   c. gating means for reactivating said electronic switching means after a variable predetermined time lag whereby the speed of said electric motor may be varied without a constant drain of power from the source of DC voltage.

2. The improvement according to claim 1 wherein said electronic switching means includes a silicon controlled rectifier.

3. The improvement according to claim 1 and further including at least two sets of brushes associated with said commutator with associated switching means and gating means substantially identical to each other for each set of brushes, whereby said motor cannot be stopped with all brushes adjacent said dead segment.

4. The improvement according to claim 3 wherein said gating means comprises a variable frequency pulse generator.

5. The improvement according to claim 4 wherein said frequency generator comprises a pulse generator having a variable frequency control connected to said source of voltage and generating a square wave signal and converting the same to a $Q, \overline{Q}$ wave shape output, a quad AND gate receiving said Q, ovs/Q/ wave and converting the same to two identical frequencies, but 180° out of phase pulse signals, a pair of transistors, each transistor receiving one of said pulse signals and delivering it to its corresponding switching means causing a regating thereof.

* * * * *